United States Patent [19]

Aoki

[11] 4,044,653
[45] Aug. 30, 1977

[54] HYDRAULIC CONTROL APPARATUS FOR INJECTION MOLDING FLUENT PLASTIC MATERIAL

[75] Inventor: Katashi Aoki, Sakaki, Japan

[73] Assignee: Nissei Plastics Industrial Co., Ltd., Japan

[21] Appl. No.: 611,802

[22] Filed: Sept. 9, 1975

Related U.S. Application Data

[62] Division of Ser. No. 414,655, Nov. 12, 1972, abandoned.

[30] Foreign Application Priority Data

Nov. 17, 1972 Japan .................................. 47-114830

[51] Int. Cl.² .......................................... F15B 15/20
[52] U.S. Cl. ............................. 91/392; 60/468; 60/DIG. 2; 91/48; 91/451; 91/459; 164/154; 425/145
[58] Field of Search ............... 91/461, 449, 35, 459, 91/275, 361, 400, 446, 451, 392, 48; 60/DIG. 2, 468

[56] References Cited

U.S. PATENT DOCUMENTS

| | | | |
|---|---|---|---|
| 2,265,800 | 12/1941 | Connor | 51/290 |
| 3,164,065 | 1/1965 | Frantz | 91/449 |
| 3,463,036 | 8/1969 | O'Conner | 91/392 |
| 3,474,824 | 10/1969 | Roy | 91/451 |
| 3,700,396 | 10/1972 | Adams | 91/449 |
| 3,752,363 | 8/1973 | Fegley | 425/145 |
| 3,767,339 | 10/1973 | Hunkar | 425/145 |

FOREIGN PATENT DOCUMENTS 337,076  12/1954  Switzerland ........................... 91/451

*Primary Examiner*—Martin P. Schwadron
*Assistant Examiner*—Abraham Hershkovitz
*Attorney, Agent, or Firm*—Weingarten, Maxham & Schurgin

[57] ABSTRACT

Hydraulic control apparatus for controlling the rate of flow of a fluent plastic from an injection nozzle of an injection molding machine wherein an injection ram is connected to a hydraulic piston in a hydraulic cylinder. The control apparatus controls the pressure exerted by a hydraulic fluid in the cylinder by means of a main hydraulic circuit including the cylinder, a valve and a pump connected in series and a main line pressure valve connecting in parallel a plurality of pilot pressure control valves having different pressure set points to the main line. The pilot pressure control valves are operated in sequence by an electrical relay and timer circuit, or a combination of such circuit and limit switches.

6 Claims, 4 Drawing Figures

HYDRAULIC CONTROL APPARATUS FOR INJECTION MOLDING FLUENT PLASTIC MATERIAL

This is a division, of application Ser. No. 414,655 filed Nov. 12, 1972 and now abandoned.

BACKGROUND OF THE INVENTION

1. Field of the Invention

This invention relates to a controlling method for injection speed and pressure in an injection molding machine. More particularly, the invention relates to said controlling method in which both of the injection speed and injection pressure can be effectively controlled by the use of an improved pressure controlling system without the use of conventional combination of a flow control valve and a relief valve.

2. Description of Prior Art

In the injection molding of molten synthetic resin material, it has been commonly accepted that the injection pressure and injection speed are significant factors for the injection operation as well as the cylinder temperature, screw rotation speed, back pressure and mold temperature, for a certain molding material and a mold.

In the conventional art, the injection pressure is controlled by the pressure control valve in the hydraulic pressure circuit of the machine, and the injection speed is controlled by the flow control valve. One should note the relation between the above two. That is, when the set pressure of the pressure control valve is higher than the pressure which is necessary to inject the material into the mold cavity, the injection pressure during the injection step is lower than the set pressure of the pressure control valve, and the injection speed is kept at the set point of the flow control valve. And when the filling is completed, the injection speed approaches zero, and the injection pressure rises near to the set pressure of the pressure control valve and kept at this pressure.

While, in case the set point of the injection pressure is lower than the pressure which is necessary for the injection, the actual injection pressure can not be increased higher than the set pressure of the pressure control valve, therefore the injection speed becomes lower than the set point of the flow control valve.

The reason why the injection pressure and injection speed do not always coincide with the set points thereof is that the necessary pressure for filling the material into the mold depends upon the flow speed of the material as well as the resistance from the screw cylinder through the nozzle, sprue, runner and gate into the mold cavity which is determined by the configuration and length of the resin passage and the viscosity of the molten resin.

In the prior art, when the injection speed is changed in the injection process, flow control valves according to the number of steps are provided in the circuit, and limit switches in the same number as said valves are also provided so as to be operated in order during the injection. Thus, the stepwise changes of the injection speed can be carried out by interconnecting said flow control valves and limit switches. However, the total discharge of the pump is passed through said circuit, so that the flow control valves and their respective change-over valves must have sufficient capacities to receive the quantities of the passed hydraulic oil.

As disclosed in the above, the speed control of the conventional hydraulic cylinder is accomplished by the flow control in which the quantity of the hydraulic oil to the cylinder is regulated.

BRIEF SUMMARY OF THE INVENTION

The inventor of the present invention has found that, under a large load, the injection pressure is nearly in proportion to the injection speed, that is, when the pressure of the circuit is decreased at a certain load, a portion of the hydraulic pressure is delivered to the tank through the pressure control valve, and the speed of the cylinder is reduced as much.

In view of the above, the object of the present invention is to propose an improved method of controlling the injection speed as well as the injection pressure by changing the pressure of the hydraulic circuit.

Another object of the present invention is to propose a controlling method of injection speed and pressure in which the injection speed can be effectively changed by controlling the pressure of the hydraulic circuit, and in order to accomplish the stepwise changes of the injection speed in the injection process through said hydraulic pressure control, a plurality of pressure control valves and change-over valves in the same number as that of said steps are provided to the hydraulic circuit to form a pilot circuit for a main pressure control valve, thus the quantity of hydraulic oil flow in said pilot circuit is small. Therefore, the loss of hydraulic pressure from the pump can be made very small.

Other object of the present invention is to propose a controlling method of injection speed and pressure in which the conventional combination of a flow control valve and relief valve is not used in the hydraulic circuit.

Still other object of the present invention is to propose a controlling method of injection speed and pressure in which the appliances as used are small as compared with those used in the conventional flow controlling method, and the values of pressures and times can be easily set according to the changes of material flow in the mold. Therefore, good molded articles without internal stress and unequal thickness can be formed, and the defects on the surface of molded articles such as flow marks and weld lines are not formed as the state of injection can be controlled by raising the injection speed.

The last object of the present invention is to propose a controlling method of injection speed and pressure in which the aforementioned pressure control valves in the pilot circuit are electrically operated in a certain order by using for example timer and relay circuit.

Pursuant to the above objects, the method of the present invention is characterized in that the hydraulic circuit for controlling the injection is provided with a main pressure control valve which is connected to a plurality of subsidiary pressure control valves having respective pressure control set points, said subsidiary pressure control valves are electrically operated in a certain order at predetermined intervals to control loaded closed circuit pressure to the respective set points, thereby controlling stepwise the injection speed and pressure through said changes of pressure.

BRIEF DESCRIPTION OF THE DRAWINGS:

These and other objects and features of the present invention will become more apparent from the following description taken in connection with the accompanying drawings, in which.

DETAILED DESCRIPTION OF THE INVENTION

Figure 1:
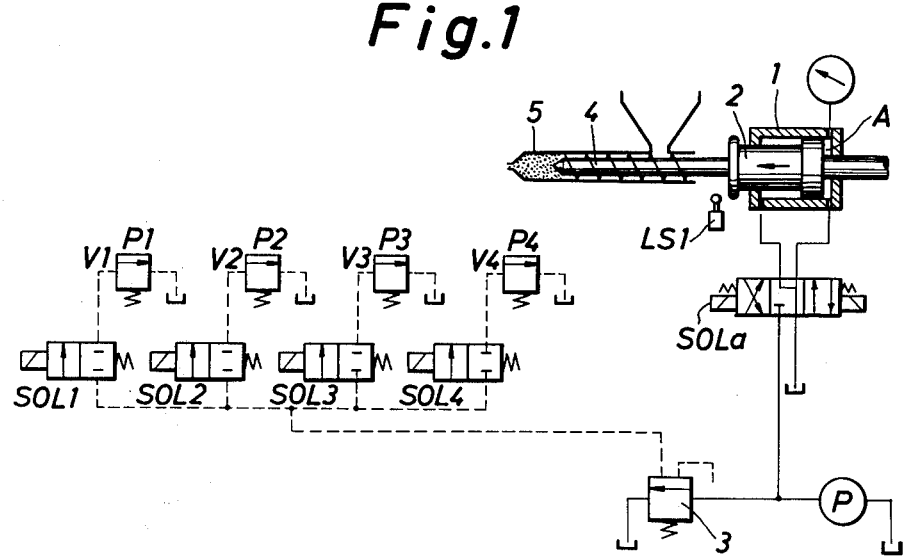
FIG. 1 is a hydraulic system diagram for carrying out the control method of the present invention.

Referring now to the drawings, and particularly to FIG. 1, the numeral 1 designates an injection cylinder, in which one end of an injection screw 4 is integrally provided with a piston 2. The numeral 3 is a main pressure control valve in the injection hydraulic circuit having a pump P and a solenoid valve SOLa. Said main pressure control valve 3 is provided with a pilot circuit which comprises four pressure control valves $V_1$, $V_2$, $V_3$ and $V_4$, and four solenoid valves $SOL_1$, $SOL_2$, $SOL_3$ and $SOL_4$ which cause said control valves to operate successively. The numeral 5 is a heating cylinder which is provided with an injection nozzle at the top end.

Figure 2:
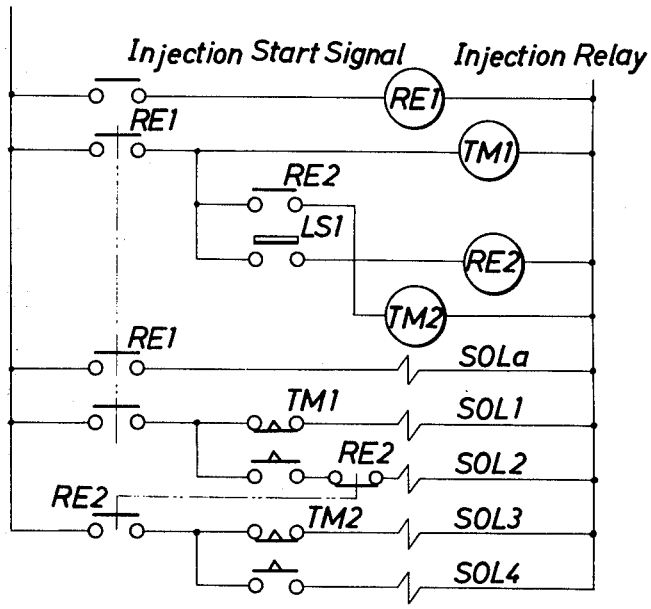
FIG. 2 is a wiring diagram for the system shown in FIG. 1.
Figure 3:
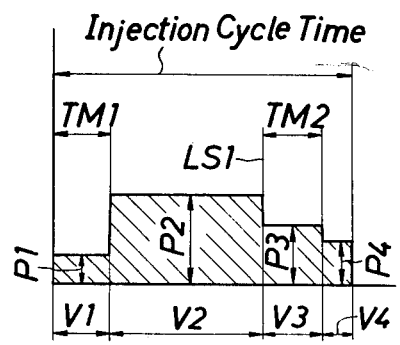
FIG. 3 is a diagrammatic illustration of the injection cycle time in the method of the present invention.

Then the method of the present invention will be explained with reference to the electric circuit shown in FIG. 2. In the first place, when an injection start signal is given, an injection solenoid SOLa is operated as the injection relay $RE_1$ is switched on, and the hydraulic pressure from a pump P is delivered into the chamber A of the injection cylinder 1, thus the forward movement of the injection piston 2 is started. The circuit pressure at this state is the set point $P_1$ of the pressure control valve $V_1$, because the solenoid $SOL_1$ is in operation, and the pressure at this set point is kept as long as the timer $TM_1$ is in operation. After the lapse of the set time of the timer $TM_1$, the solenoid $SOL_1$ is switched off and the solenoid $SOL_2$ is switched on. Accordingly, the circuit pressure becomes the set point $P_2$ of the pressure control valve $V_2$, and the forward movement of the injection piston 2 is continued, thus pushing a limit switch $LS_1$. When the limit switch $LS_1$ is pushed by the piston 2, the solenoid $SOL_2$ is switched off and the relay $RE_2$ is actuated, so that the solenoid $SOL_3$ is operated and the circuit pressure becomes the set point $P_3$ of the pressure control valve $V_3$. At the same time timer $TM_2$ is started, and this state is kept during the set time of this timer $TM_2$. After said set time of the time $TM_2$, the solenoid $SOL_3$ is switched off and the solenoid $SOL_4$ is switched on. Thus the circuit pressure is changed to the set point $P_4$ of the pressure control valve $V_4$, and as the result, the injection speeds and pressure changes as shown in FIG. 3 can be accomplished.

Figure 4:
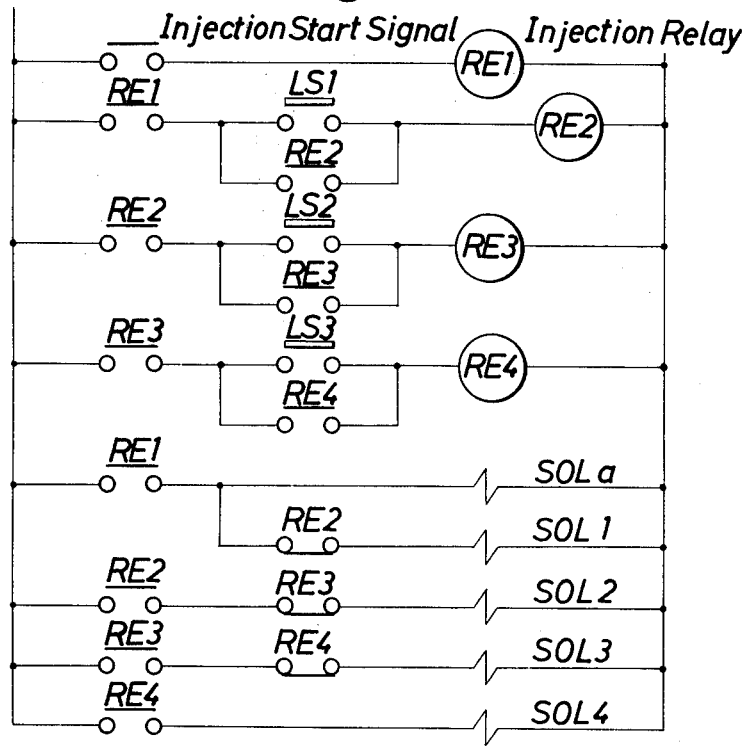
FIG. 4 is a wiring diagram for another embodiment.

In the electric circuit as shown in FIG. 4, each pressure control valve $V_1$, $V_2$, $V_3$ or $V_4$ is operated by the relay circuit. When the injection start signal is given, the solenoid SOLa is operated by the action of the injection relay $RE_1$, and the hydraulic pressure P is delivered to the chamber A of the injection cylinder 1, thereby the forward movement of the injection piston 2 is started. At this state, as the solenoid $SOL_1$ is simultaneously actuated, the circuit pressure becomes the set point $P_1$ of the pressure control valve $V_1$. When the limit switch $LS_1$ is pushed by the forward movement of the injection piston 2, the relay $RE_2$ is actuated to switch off the solenoid $SOL_1$, at the same time, the solenoid $SOL_2$ is actuated, thus the circuit pressure is changed to the set point $P_2$ of the pressure control valve $V_2$. Further, when the limit switch $LS_2$ is pushed, the relay $RE_3$ is actuated to switch off the solenoid $SOL_2$ and actuate the solenoid $SOL_3$, thereby the circuit pressure is changed to the set point $P_3$ of the pressure control valve $V_3$. The injection piston 2 further advancing to push the limit switch $LS_3$, the relay $RE_4$ is activated to switch off the solenoid $SOL_3$ and, at the same time, the solenoid $SOL_4$ is operated, thereby the circuit pressure is changed to the set point $P_4$ of the pressure control valve $V_4$.

As disclosed in the above, the pressure at the set point of each pressure control valve can be kept until the injection piston pushes the next limit switch. Accordingly, if the limit switch is fitted so as to be moved freely, the retention time of the pressure at a set point of the pressure control valve can be selected at will.

It should be emphasized, however, that the specific embodiments described and shown herein are intended as merely illustrative and in no way restrictive of the invention.

What is claimed is:

1. Hydraulic control apparatus for controlling the injection speed and pressure of an injection molding machine having a hydraulic cylinder with a piston therein coupled to an injection molding nozzle, said apparatus comprising:
    a source of hydraulic fluid;
    a hydraulic fluid pump;
    a main hydraulic circuit comprising:
        a main line connected to said hydraulic cylinder, said pump being arranged to provide hydraulic fluid under pressure from said fluid source to said main line; and
        valve means in said main line between said pump and said hydraulic cylinder for controlling the application of hydraulic fluid to said cylinder for selective actuation of said piston in either direction;
    a pilot hydraulic circuit for controlling the pressure in said main line, said pilot circuit comprising:
        a plurality of pilot pressure control valves each having a pressure set point;
        a like plurality of pilot pressure control lines respectively connecting said pilot pressure control valves in parallel;
        a main pressure control valve, said parallel pilot pressure control lines being connected to said main line between said pump and said valve means through said main pressure control valve, said main pressure control valve being arranged to selectively provide hydraulic fluid under pressure to said pilot pressure control lines; and
        means in each pilot pressure control line for selectively and individually isolating and connecting the respective one of said pilot pressure control valves to said main pressure control valve; and
    means for sequentially and individually actuating selective isolating and connecting means in said pilot pressure control lines for respective predetermined periods of time to sequentially adjust the main line pressure to the respective pressure set points by coupling said main line individually to said pilot pressure control valves through said main pressure control valve and through a respective isolating and connecting means, only one of each of said pilot pressure control valves and its respective pilot pressure control line and isolating and connecting means being coupled through said main pressure control valve to said main line at any one time, whereby the pressure within said hydraulic cylinder and the speed of movement of said piston therein is controlled.

2. The hydraulic control apparatus recited in claim 1 wherein said main pressure control valve is adapted to selectively discharge hydraulic fluid from said main line to relieve the pressure therein.

3. The hydraulic control apparatus recited in claim 1 wherein said means for sequentially and individually actuating said isolating and connecting means also comprises timing means for controlling said predetermined periods of time during which said main line is coupled to each of said pilot pressure control valves.

4. The hydraulic control apparatus recited in claim 3 wherein:
a first of said isolating and connecting means connects a first of said pilot pressure control valves to said main line through said main pressure control valve for a first predetermined period of time to thereby adjust said main line pressure to a first pressure set point; and
the remainder of said isolating and connecting means sequentially and individually connects the remainder of said pilot pressure control valves to said main line through said main pressure control valve for individual predetermined periods of time to thereby sequentially adjust said main line pressure to said remaining pressure set points.

5. The hydraulic control apparatus recited in claim 1 wherein:
said isolating and connecting means each comprises a solenoid valve; and
said sequentially and individually actuating means comprises a plurality of relays and a plurality of timing means each having a respective predetermined period of operation, the period of operation of each succeeding timing means commencing upon expiration of the period of operation of the preceding timing means.

6. The hydraulic control apparatus recited in claim 1 wherein said means for sequentially and individually actuating said selective isolating and connecting means comprises:
a first timer coupled to said means in each pilot pressure control line for selectively isolating and connecting the respective one of said pilot pressure control valves to said main pressure control valve having a first predetermined time period during which a first of said pilot pressure control valves is connected to said main pressure control valve, said timer connecting a second of said pilot pressure control valves to said main pressure control valve upon expiration of said predetermined time period;
a limit switch mounted to machine and actuated by said cylinder to disconnect said second pilot pressure control valve and connect a third of said pilot pressure control valves to said main pressure control valve;
a second timer coupled to said means in each pilot pressure control line similarly to said first timer, said second timer having a second predetermined time period during which said third pilot pressure control valve is connected to said main pressure control valve, said timer connecting a fourth of said pilot pressure control valves to said main pressure control valve upon expiration of said second predetermined time period.

* * * * *